United States Patent [19]
Ohmi et al.

[11] Patent Number: 6,152,168
[45] Date of Patent: Nov. 28, 2000

[54] PRESSURE-TYPE FLOW RATE CONTROL APPARATUS

[75] Inventors: Tadahiro Ohmi, 1-17-301, Komegahukuro 2-Chome, Aoba-ku, Sendai-shi, Miyagi 980-0813; Tetu Kagazume; Kazuhiko Sugiyama, both of Yamanashi; Ryousuke Dohi, Osaka; Tomio Uno, Osaka; Kouji Nishino, Osaka; Hiroyuki Fukuda, Osaka; Nobukazu Ikeda, Osaka; Michio Yamaji, Osaka, all of Japan

[73] Assignees: Fujikin Incorporated, Osaka; Tadahiro Ohmi, Miyagi; Tokyo Electron Ltd., Tokyo, all of Japan

[21] Appl. No.: 09/284,352

[22] PCT Filed: Aug. 13, 1998

[86] PCT No.: PCT/JP98/03620

§ 371 Date: May 24, 1999

§ 102(e) Date: May 24, 1999

[87] PCT Pub. No.: WO99/09463

PCT Pub. Date: Feb. 25, 1999

[30] Foreign Application Priority Data

Aug. 15, 1997 [JP] Japan ..................... 9-220367

[51] Int. Cl.$^7$ ..................................... G05D 7/06
[52] U.S. Cl. ........................ 137/487.5; 137/486
[58] Field of Search ................ 137/487.5, 486

[56] References Cited

U.S. PATENT DOCUMENTS 5,791,369  8/1998  Nishino et al. ............... 137/487.5 X

*Primary Examiner*—Gerald A. Michalsky
*Attorney, Agent, or Firm*—Griffin & Szipl, P.C.

[57] ABSTRACT

A pressure-type flow rate control apparatus for use especially in the gas supply system in semiconductor manufacturing facilities. The flow control apparatus is provided with a bore-variable orifice, which permits easy switching of the fluid flow rate control range as well as size reduction of the pressure-type flow control apparatus, and offers other advantages including improved gas replaceability, prevention of dust formation, and reduced manufacturing costs of the flow control system. The apparatus comprises an orifice, a control valve provided on the upstream side of the orifice, a pressure detector provided between the control valve and the orifice, and a control unit to calculate a fluid flow rate Q on the basis of a pressure P1 detected by the pressure detector with the equation Q=KP1 (K=constant) and to output in a drive for the control valve the difference between the set flow rate signal Qs and the calculated flow rate signal Q as control signal Qy, wherein the pressure P1 on the upstream side of the orifice is regulated by actuating the control valve for controlling the flow rate of the fluid downstream of the orifice with the ratio P2/P1 between the pressure P1 on the upstream side of the orifice and the downstream pressure P2 maintained at not higher than the ratio of the critical pressure of the controlled fluid, characterized in that a direct touch type metal diaphragm valve unit functions as the orifice and that the ring-shaped gap between the valve seat and the diaphragm serves a variable orifice wherein the gap is adjusted by the orifice drive.

15 Claims, 10 Drawing Sheets

PRESSURE-TYPE FLOW RATE CONTROL APPARATUS

FIELD OF THE INVENTION

The present invention relates to an improvement of a pressure type flow rate control apparatus for fluids such as gases. More particularly, the present invention relates to the flow control of a gas supply system chiefly for use in semiconductor manufacturing facilities.

BACKGROUND OF THE INVENTION

Mass flow controllers have been widely used as flow rate control apparatuses for the gas supply system in semiconductor manufacturing plants. Recent years have seen the development of pressure-type flow rate control apparatuses that are replacing the mass flow controllers. Among the newly developed pressure-type control apparatuses are those disclosed in unexamined Japanese patent publications Nos. 8-335117 and 8-338546.

FIG. 11 shows the pressure-type flow rate control apparatus which the inventors disclosed earlier in the above-mentioned unexamined Japanese patent publication No. 8-338546. The operating principle of that pressure-type flow rate control apparatus is this: The flow rate Qc of fluid on the downstream side of the orifice is calculated with an equation Qc=KP1 (K: constant), with the ratio P2/P1 of pressure P2 at the downstream side of an orifice 5 to pressure P1 of the upstream side held below the gas critical pressure ratio. The difference between the calculated flow rate Qc and the set flow rate Qs is input in a valve drive 3 for a control value 2 as control signal Qy to regulate the degree of opening of the control valve 2 for adjusting the pressure P1 upstream of an orifice 5, such that the calculated flow rate Qc=the set flow rate Qs (that is, the control signal Qy=0) is achieved. Thus, the flow rate on the downstream side of the orifice is regulated to the aforesaid set flow rate Qs.

Referring to FIG. 11, the reference number 1 indicates a pressure-type flow rate control apparatus; 2, a control valve; 3, a control valve drive; 4, a pressure detector; 5, an orifice; 7, a control unit; 7a, a temperature correction circuit; 7b, a flow rate calculation circuit; 7c, a comparison circuit; 7d, an amplification circuit; 21a and 21b, amplification circuits; 22a and 22b, A–D conversion circuits; 24, an inverted amplifier; 25, a valve; Qc, signal for calculated flow rate; Qs, signal for set flow rate; and Qy, control signal (Qc–Qs).

The aforesaid pressure-type flow control system permits setting the flow rate Q on the downstream side of the orifice at a desired level with high precision through adjustment of the pressure P1 on the upstream side of the orifice by actuating the control valve 2. Thus, the apparatus is a highly effective tool in practice.

However, the problem with that pressure-type flow rate control apparatus is that because the orifice 5 is fixed in diameter, the application is limited to a specific range of flow rates and no switch-over in the flow rate ranges is possible.

To make the switch-over possible, it is necessary to so design the orifice 5 as to be readily replaceable, and to prepare a plurality of orifices 5 with different bores or calibers ready for use. But a problem is that non-uniformity in precision of processing of those orifices 5 leads directly to errors in flow rate control.

Preparing a plurality of orifices with different bores present problems such as lack of economy and poor control precision.

Also, in a flow rate controller of a fixed flow rate type using the so-called sonic velocity nozzle (or orifice), sectional area-variable nozzles or orifices have been developed for permitting a change in the flow rate range, and disclosed in unexamined Japanese utility model publication No. 56-41210 and examined Japanese utility model publication No. 60-42332.

However, these sectional area-variable orifices are all those with mechanisms similar to needle-type valves and are inevitably accompanied by many dead spaces in the fluid flow path. That makes complete gas switching or replacement difficult and causes much dust. For this reason, those sectional area-variable orifices are not very suitable for use in the gas supply system in semiconductor manufacturing facilities.

SUMMARY OF THE INVENTION

It is an object of the present invention to solve the problems encountered with the prior art pressure-type flow rate control apparatuses. The problems include: (a) because the orifice has a fixed diameter, the flow rate range cannot be switched over from one range to another, (b) processing an orifice with high precision is a difficult job and non-uniformity in processing precision directly leads to errors in controlled flow rate, resulting in failure to achieve a highly reliable and stable flow rate control, and (c) the prior art sectional area-variable orifices cannot effect complete gas switching or replacement and produce dust, and therefore cannot be used properly in the gas supply system in semiconductor manufacturing facilities. The foregoing object may be achieved by providing a pressure-type flow rate control apparatus which permits an easy adjustment of the orifice sectional area and a high-precision flow rate control at a wide range of flow rates without difficulty and which is superior in gas switching or replacement and prevention of dust, such that it is usable in the gas supply system in semiconductor manufacturing facilities.

The inventors have conceived an idea of using as a sectional area-variable orifice a direct touch type metal diaphragm valve unit which is high in cleanliness and in replaceability of gases. These are indispensable features for equipment used in the gas supply system in semiconductor manufacturing facilities. Then, the inventors conducted research to determine if the fluid passage of the direct touch type metal diaphragm valve unit is capable of controlling the flow rate as efficiently as the so-called supersonic velocity orifice or nozzle.

FIG. 1 shows a flow rate control testing apparatus using as a sectional area-variable orifice the aforementioned direct touch type metal diaphragm valve unit. In FIG. 1, the reference number 2 indicates a pressure control valve; 3, a control valve drive; 4, a pressure detector; 5, a variable orifice (a direct touch type metal diaphragm valve unit); 6, an orifice drive; 7, a control circuit; 8a, a gas inlet; 8b, a gas outlet; 9, a mass flow meter; 10, a vacuum chamber; 10a, a vacuum gauge; and 11, a vacuum pump.

The aforesaid control valve 2 is the same direct touch type metal diaphragm valve unit as disclosed in unexamined Japanese patent publication 8 -338546. The drive 3 is provided with a piezoelectric element type drive unit. The drive 3 for the control valve 2 may alternatively be other drive units, such as a magnetostrictive element type, a solenoid type, a motor type, an air pressure type, and a thermal expansion type.

The aforesaid pressure detector 4 is a semiconductor strain gauge. To be concrete, the pressure detector 4 is incorporated in the valve main body of the pressure-control valve 2, as in unexamined Japanese patent publication No. 8-338546.

A direct touch type metal diaphragm valve, which will be described later, is used as the variable orifice 5, and the drive 6 is provided with a pulse motor drive, that is, a linear actuator working on a pulse motor and a ball screw mechanism.

The control circuit 7' compares a detected pressure signal Qp1 from the pressure detector 4 on the upstream side of the orifice with the set pressure Qps, and inputs a control signal Qy in the control valve drive 3 to bring the pressure difference to zero, thereby controlling the control valve 2.

The direct touch type metal diaphragm valve unit, which constitutes the variable orifice 5, includes a stainless steel valve main body 12, a diaphragm 13 made of stainless steel or a nickel-cobalt alloy, and a pulse motor type drive 6 to press down the diaphragm 13 as shown in FIG. 2. The valve main body 12 is provided with a fluid inlet 12a, a valve seat 12b, a valve chamber 12c, and a fluid outlet 12e.

When the pulse motor 14 is set to take the initial position, the diaphragm 13 is pressed down by a guide slider 18 and a diaphragm presser 16 through a ball screw mechanism 19 against the elastic force of springs 17 and 15 until the diaphragm 13 sits on the valve seat 12b for closing the valve.

In the next step, when an orifice control signal Qz is input in the pulse motor 14, the pulse motor 14 rotates in such direction that the guide slider 18 is pulled up through the ball screw mechanism 19 and the diaphragm presser 16 is pushed upward by the elastic force of the spring 15.

As a result, the diaphragm 13 returns in the upward direction to the original position, moving away from the valve seat 12b, thereby forming a ring-shaped fluid passage (orifice) between the valve seat 12b and the diaphragm 13.

In this embodiment, the pulse motor 14 is a so-called stepping motor producing 50,000 pulses per revolution. The ball screw mechanism 19 has a thread pitch of 0.5 mm/revolution.

In that arrangement, inputting one pulse in the pulse motor 14 moves or displaces the diaphragm by 10 nm, thereby permitting a very high precision control of the opening degree of the orifice. In FIG. 2, the reference number 20 indicates a coupling; 21, a bearing; and 22, the shaft of the ball screw mechanism.

The mass flow meter 9 measures the gas flow rate Q on the downstream side of the variable orifice 5 and outputs the detected flow rate signal Qx.

The vacuum chamber 10, vacuum gauge 10a, and vacuum pump 11 are included in the semiconductor manufacturing facilities. The pressure within the vacuum chamber 10 is generally maintained at a vacuum of several torr.

When testing flow rate characteristics of the variable orifice 5, an orifice control signal Qz was first input to set the opening degree of the variable orifice 5 to a specific level. Then, nitrogen gas $N_2$ with a pressure of 6.0 kg/cm$^2$ was fed into the gas inlet 8a. After that, the set pressure signal Qps was set to a level between 0 and 3 kgf/cm$^2$abs for controlling the pressure control valve 2 while the flow rate of $N_2$ on the downstream side of the orifice 5 was measured by the mass flow meter 9.

As mentioned, the vacuum chamber 10 has a cubic volume of 9.26 liters and is maintained at a vacuum of about 1 torr by the vacuum pump 11.

FIG. 3 shows the relationship between the upstream pressure, that is, the set pressure Qps and the gas flow rate Q sccm on the downstream side of the orifice where an area of the ring-shaped gap (fluid passage) of the variable orifice 5 was made equal by the orifice control signal Qz to the sectional area of an orifice with a circular bore section 0.14 mm in diameter.

It is understood that sccm is the flow rate in cubic centimeters (cc)/minutes in terms of the standard state.

FIG. 4 shows the relationship between the pressure of the upstream side of the orifice 5, that is, the set pressure Qps, and the gas flow rate Q sccm on the downstream side of the orifice where the orifice control signal Qz was changed to make an area of the ring-shaped gap (fluid passage) of the variable orifice equal to the sectional area of an orifice with a circular bore section 0.25 mm in diameter.

As is evident from FIG. 3 and FIG. 4, there exists a relationship between the flow rate Q and the upstream pressure P1 represented approximately by Q=KP1 in the region where the pressure P1 on the upstream side of the variable orifice is not lower than 0.5 kgf/cm$^2$abs with the pressure P2 on the downstream side of the orifice being 1 torr or about 133.3 Pa.

In other words, it is shown that the ring-shaped fluid passage (or the gap) between the diaphragm and the valve seat of the direct touch type metal diaphragm valve unit having a construction as shown in FIG. 2 has almost the same pressure-flow rate control characteristics as the so-called fixed orifice.

FIG. 5 indicates the flow rate characteristics of the variable orifice 5 and shows the relationship between the working stroke L of the variable orifice 5 (or length of the gap of the diaphragm 13) and the gas flow rate Q on the downstream side of the orifice under the conditions that the pressure P1 at the upstream side of the variable orifice 5 in the testing apparatus shown in FIG. 1 is held at 0.5 kgf/cm$^2$abs and the downstream pressure P2 at a vacuum degree of 1 torr.

The experiment showed that the relationship between the stroke L (mm) and the flow rate Q (sccm) is such that they are almost linearly proportional to each other. The relationship is always observed where the working stroke L is between 0 and about 0.12 mm.

FIG. 6 is a diagram depicting the relationship between the working stroke L (mm) of the variable orifice 5 and the orifice bore or diameter Ø (mm), where each orifice diameter is calculated on the basis of each flow rate in FIG. 5 assuming that the orifice was circular in bore shape. It was found that the relationship between the stroke L (mm) and the orifice bore (mm) is always observed, i.e., is reproducible.

That is, as is clear from FIG. 5 and FIG. 6, there always exists a fixed correlation between the working stroke L (mm) of the variable orifice 5 and the flow rate Q (sccm) or between the working stroke L and the orifice bore diameter Ø (mm). Therefore, it is possible to accurately bring the diameter Ø (mm) of the variable orifice or the flow rate Q (sccm) to a desired level by changing the stroke L (mm). The present invention serves the purpose of a reliable variable orifice.

The present invention was developed on the basis of the results of the testing of the pressure-flow rate characteristics with the direct touch type metal diaphragm valve unit shown in FIG. 2 serving as a variable orifice. The present invention provides a pressure-type flow rate control apparatus comprising an orifice 5, a control valve 2 provided on the upstream side of the orifice 5, a pressure detector 4 provided between the control valve 2 and the orifice 5, and a control unit 7, to calculate a fluid flow rate Q on the basis of a pressure P1 detected by the pressure detector 4 with the equation Q=KP1 (K=constant) and to output in a drive 13 for the control valve 2 the difference between the set flow rate signal Qs and the calculated flow rate signal Q as control signal Qy, wherein the pressure P1 on the upstream side of the orifice is regulated by actuating the control valve 2 for controlling the flow rate Q of the fluid downstream of the orifice with the ratio P2/P1, of the pressure P2 on the downstream side of the orifice to the upstream pressure P1, maintained at not higher than the ratio of the critical pressure of the controlled fluid, characterized in that a direct touch type metal diaphragm valve unit functions as the orifice 5 and that the ring-shaped gap between the valve seat 12b and the diaphragm 13 serves as variable orifice 5.

In one embodiment the variable orifice 5 is one in which the ring-shaped gap is regulated by a pulse motor type drive. The pulse motor drive may comprise a stepping motor and a ball screw mechanism.

The variable orifice 5 is one in which the ring-shaped gap is regulated by a piezoelectric element type drive.

The working stroke L of the diaphragm 13 ranges from 0 to 0.12 mm.

The area of the ring-shaped gap (fluid passage) between the valve seat 12b and the diaphragm 13 is equal to a sectional area of a circular bore of 0.14 to 0.25 mm in diameter.

DESCRIPTION OF PREFERRED EMBODIMENTS

Embodiments of the present invention will now be described with reference to the drawings.

Figure 7:
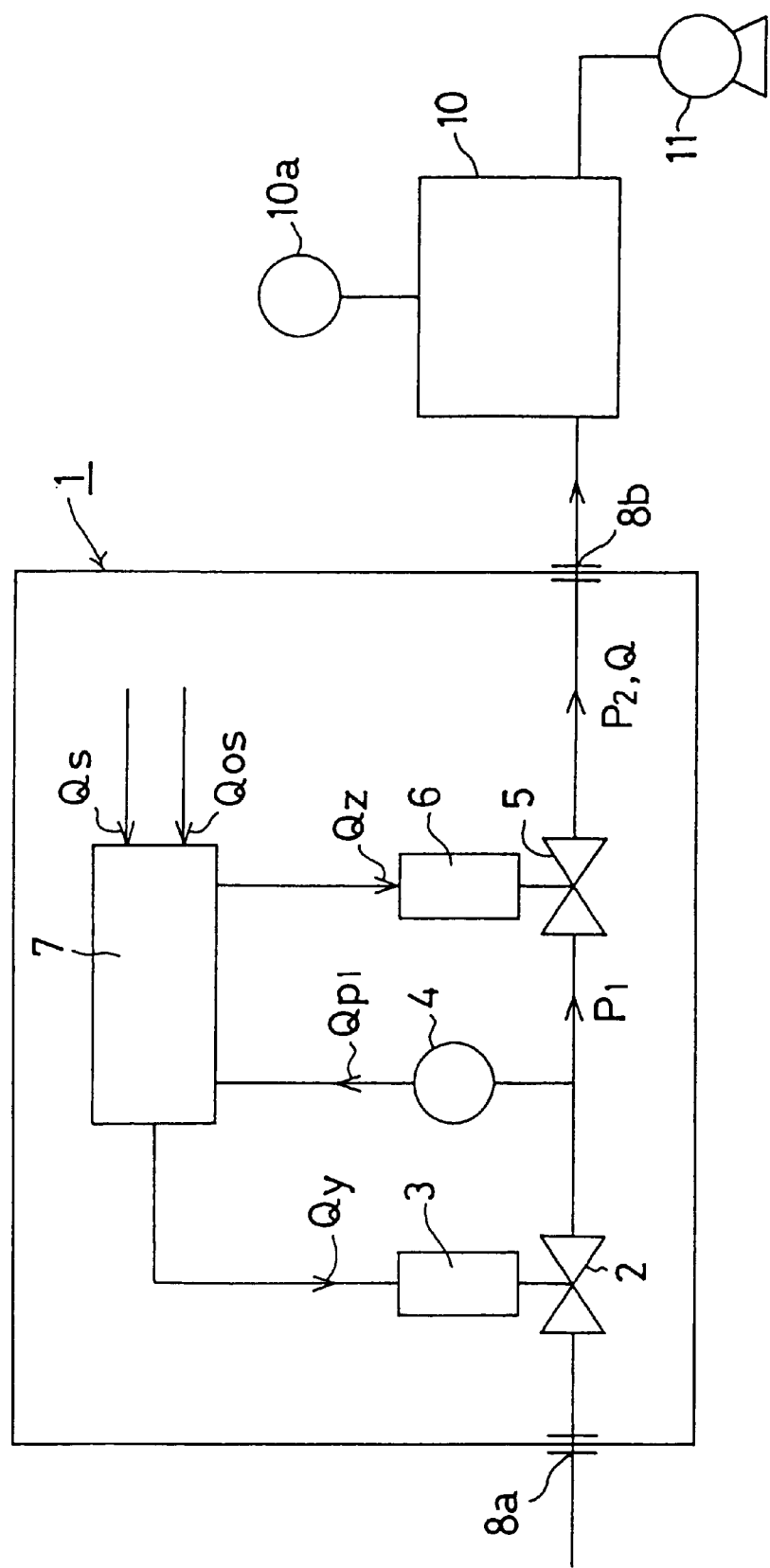
FIG. 7 is a schematic diagram of a pressure-type flow rate control apparatus according to the present invention.

FIG. 7 is a schematic diagram of a pressure type flow rate control apparatus according to the present invention. In FIG. 7, reference numeral 1 indicates a pressure type flow rate control apparatus; 2, a pressure control valve; 3, a valve drive; 4, a pressure detector; 5, a variable orifice; 6, an orifice drive; 7, a control unit; 10a, a vacuum gauge; 11, a vacuum pump; Qy, a control signal for control valve 2; Qp1, a detected pressure signal; Qz, an orifice control signal; Qs, a set flow rate signal; and Qos, a signal for setting the opening degree of orifice 5.

Figure 8:
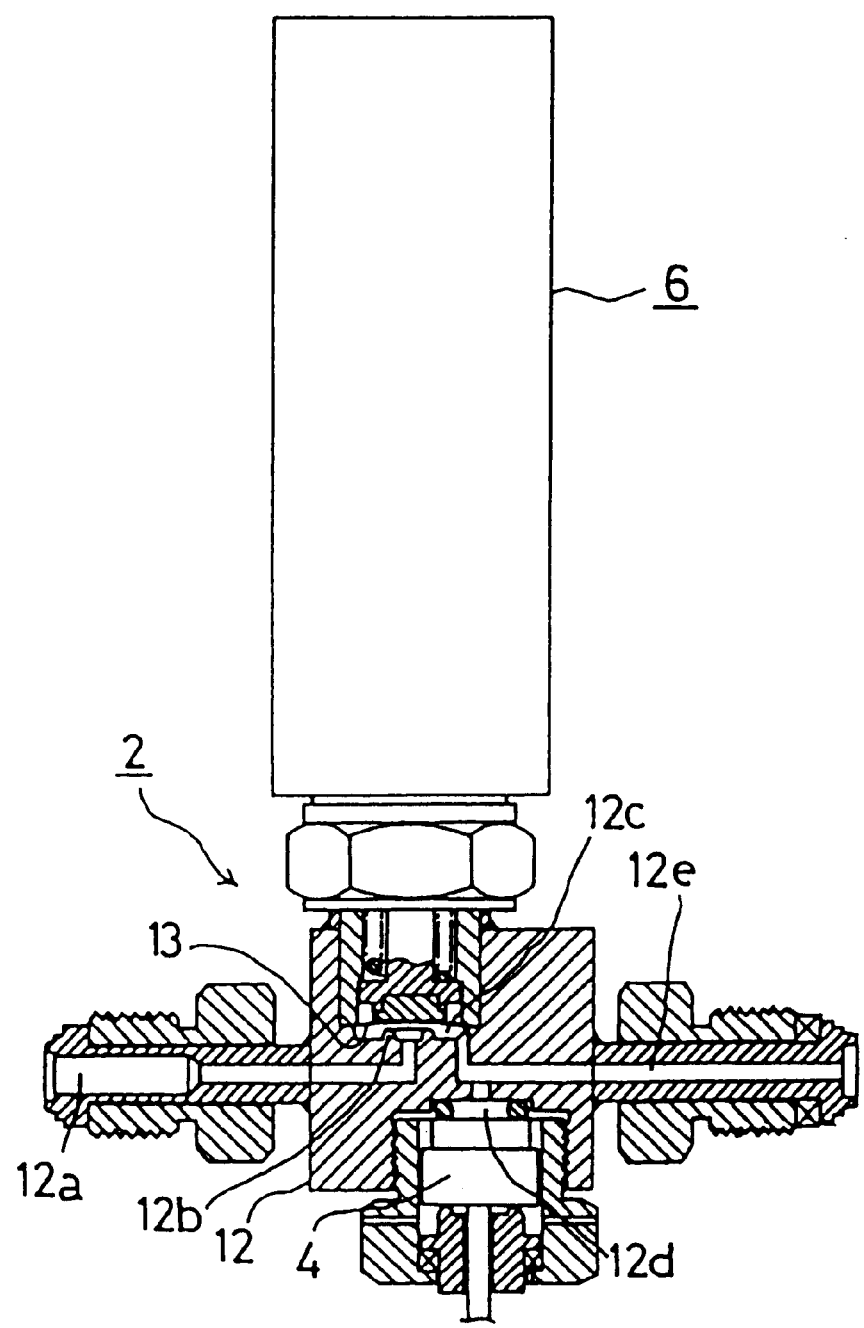
FIG. 8 is a vertical sectional view of a pressure control valve.

Pressure control valve 2 in FIG. 7 is a direct touch type metal diaphragm valve unit of the construction shown in FIG. 8, identical to that disclosed in unexamined Japanese patent publication No. 8-338546.

Pressure detector 4 is a semiconductor strain gauge, which is fixed in a pressure detector receiving hole 12d of pressure control valve 2.

Figure 1:
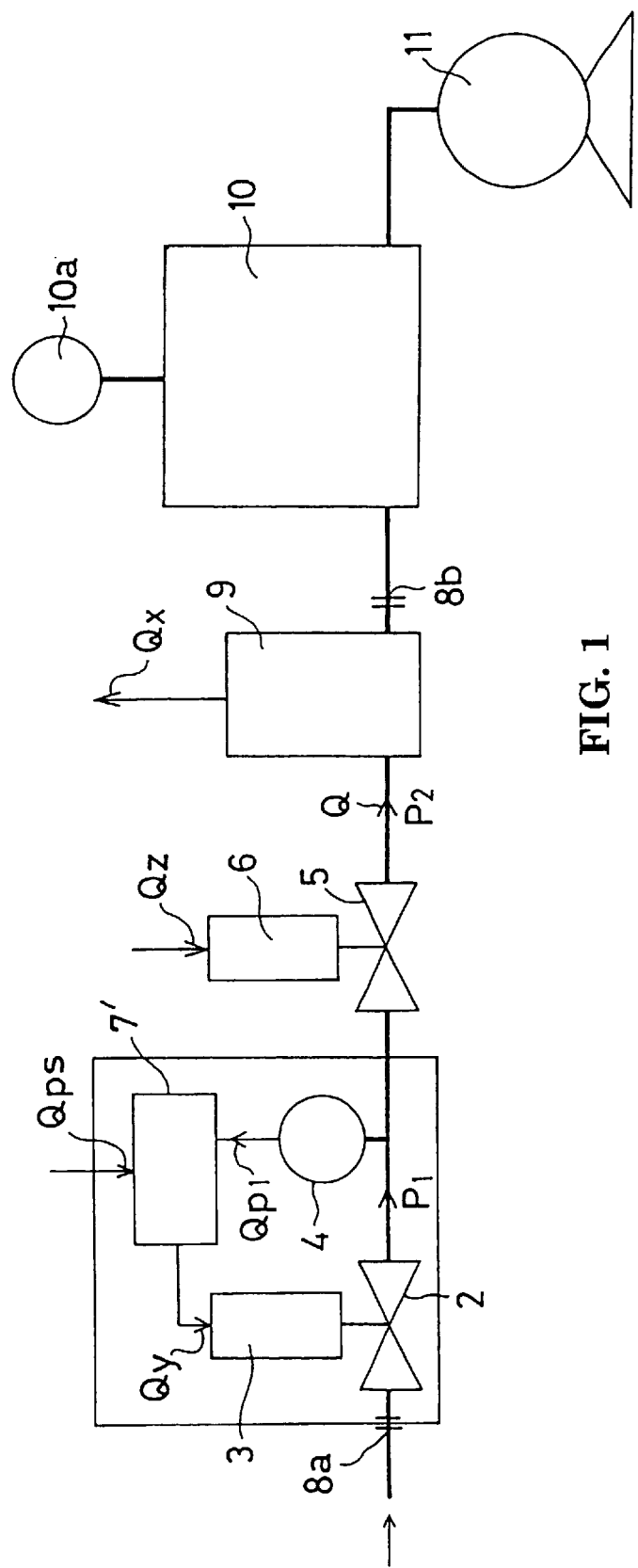
FIG. 1 is a schematic diagram of an apparatus for testing flow rate control by a variable orifice (that is, a direct touch type metal diaphragm valve unit) used in the present invention.
Figure 2:
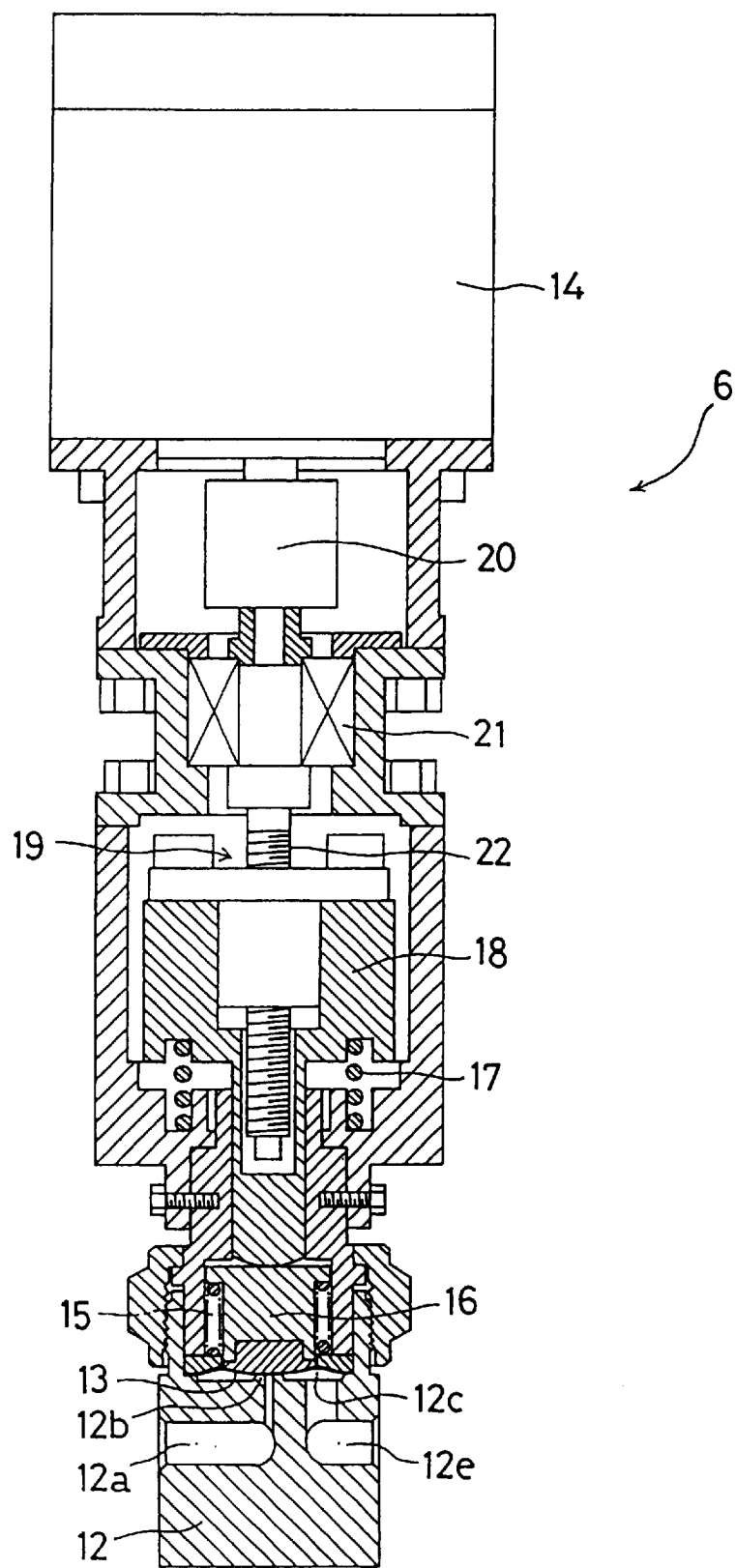
FIG. 2 is a vertical sectional view of a variable orifice used in the present invention.

The direct touch type metal diaphragm valve unit and pulse motor type drive 6 shown in FIG. 2 serve as the variable orifice 5 and its drive 6. The variable orifice 5 and the drive 6 have the same construction as those shown in FIG. 2; accordingly the description thereof is omitted.

The drive 6 is not limited to a pulse motor drive, and may be of the piezoelectric element type or the solenoid type.

The operation of the pressure flow control system will now be explained.

First, the set flow rate signal Qs and the orifice opening degree setting signal Qos are input into the control unit 7.

Then, when the gas with a specific pressure P1 is fed into the gas inlet 8a, the detected pressure signal Qp1, which corresponds to the upstream pressure P1 detected by the pressure detector 4, is input into the control unit 7, in which the flow rate Q=KP1 is calculated.

Control unit 7 outputs a control signal Qy for the control valve corresponding to the difference between the set flow rate signal Qs and the calculated flow rate Q, whereby the pressure control valve 2 is opened or closed in such a direction that the difference between Qs and Q is reduced.

Furthermore, if the bore of the variable orifice 5 is to be changed to switch over to some other control flow range, the setting of the orifice opening degree setting signal Qos is changed. Thus, the orifice control signal Qz is changed. As a result, the orifice drive 6 changes the working stroke L of the diaphragm 13, which in turn changes the orifice bore Ø (mm) accordingly.

In the embodiment shown in FIG. 7, the working stroke L is not subjected to what is called feedback control. Needless to say, the working stroke L of the orifice 6 may be detected and the detected value may be fed back to control unit 7 to effect feedback control of the working stroke L.

Figure 11:
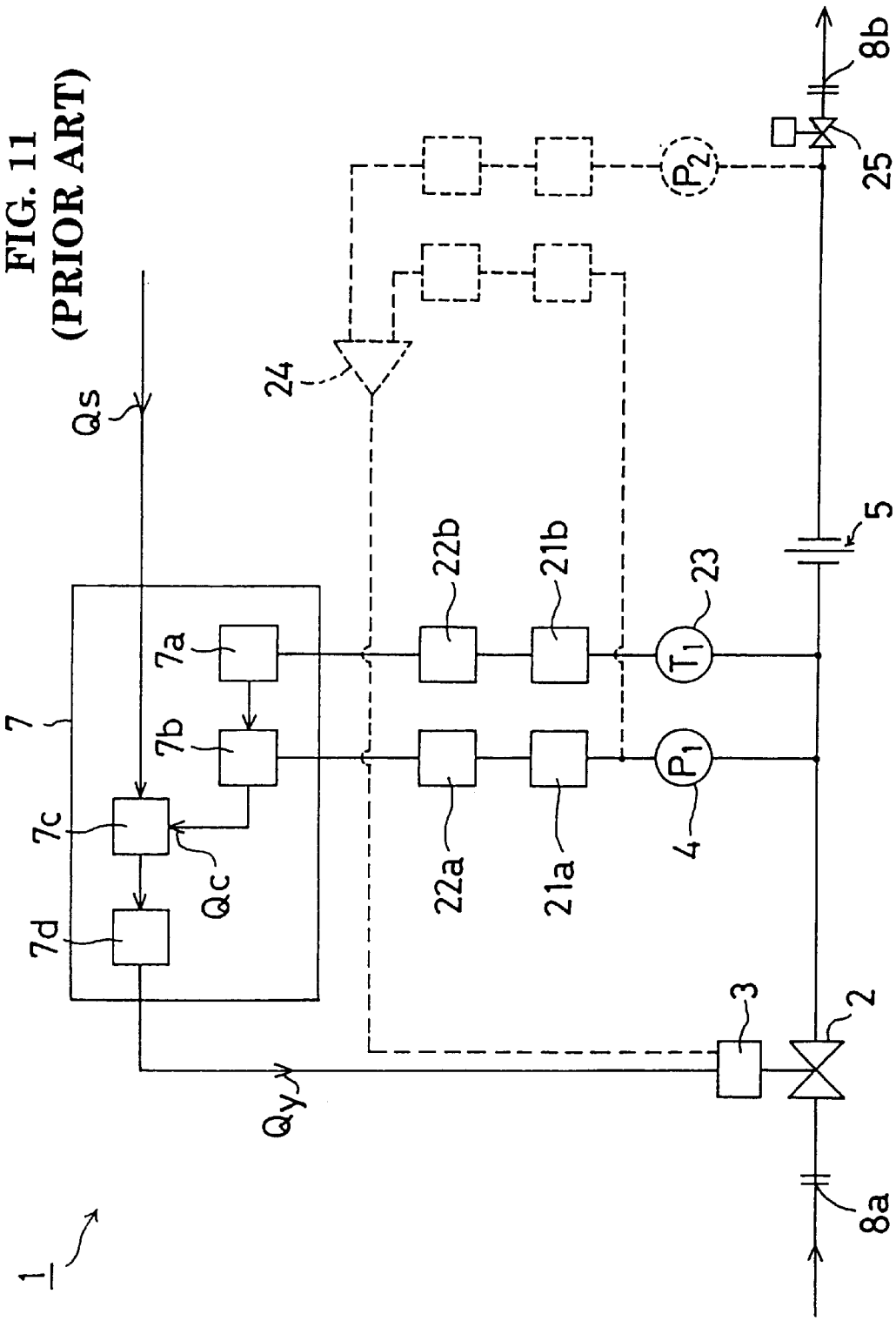
FIG. 11 is a schematic diagram showing a prior art pressure flow rate control apparatus.

Also, the embodiment illustrated in FIG. 7 is not provided with a correction circuit based on gas temperature, or an alarm circuit or a gas supply cut-off circuit which is activated when the pressure P2 on the downstream side of orifice rises, with the value of P2/P1 approaching (or exceeding) a critical value, unlike the prior art control apparatus shown in FIG. 11. Needless to say, those circuits may be provided.

Figure 3:
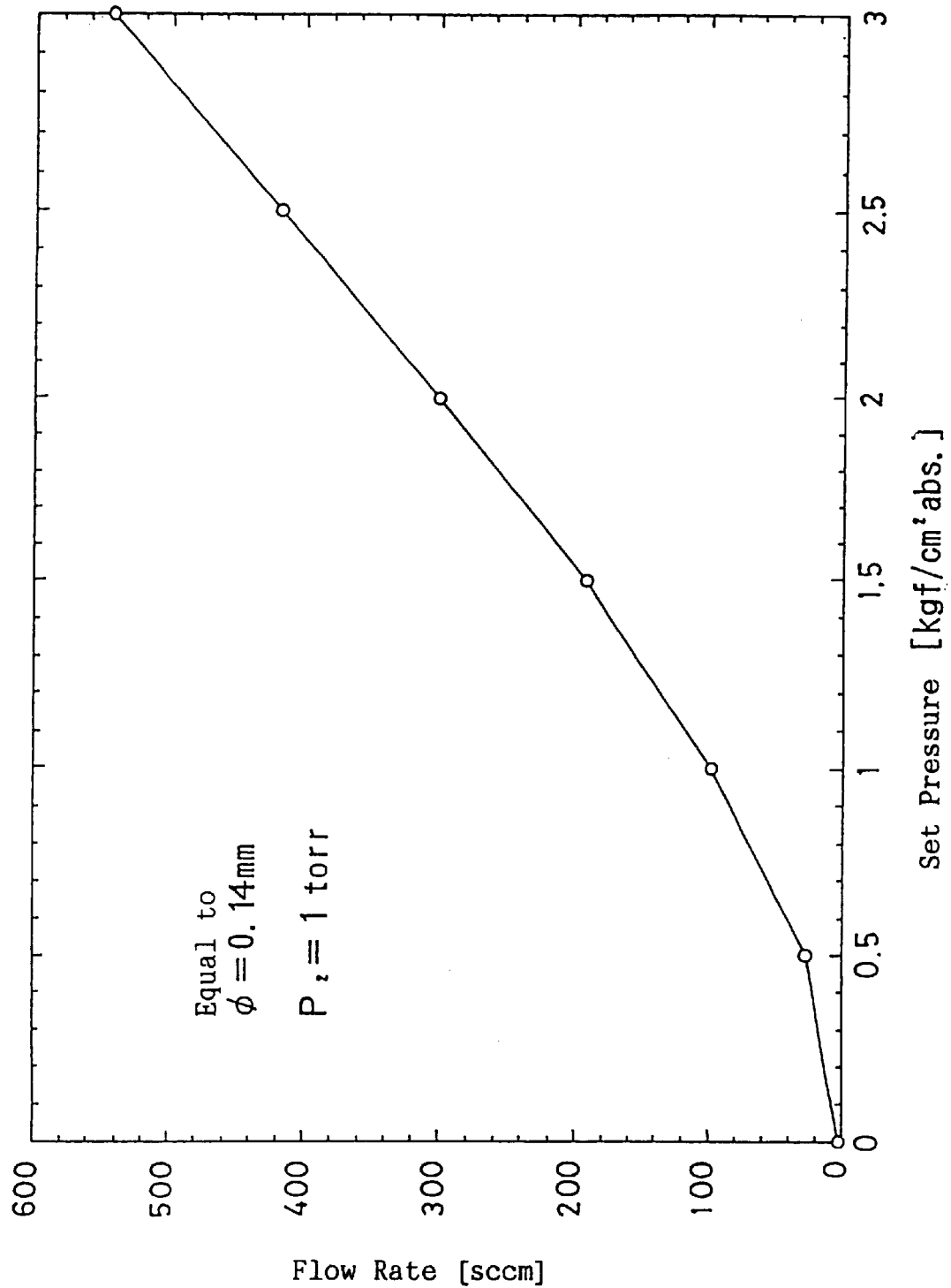
FIG. 3 illustrates an example of pressure-flow rate measurement results by the testing apparatus shown in FIG. 1.
Figure 4:
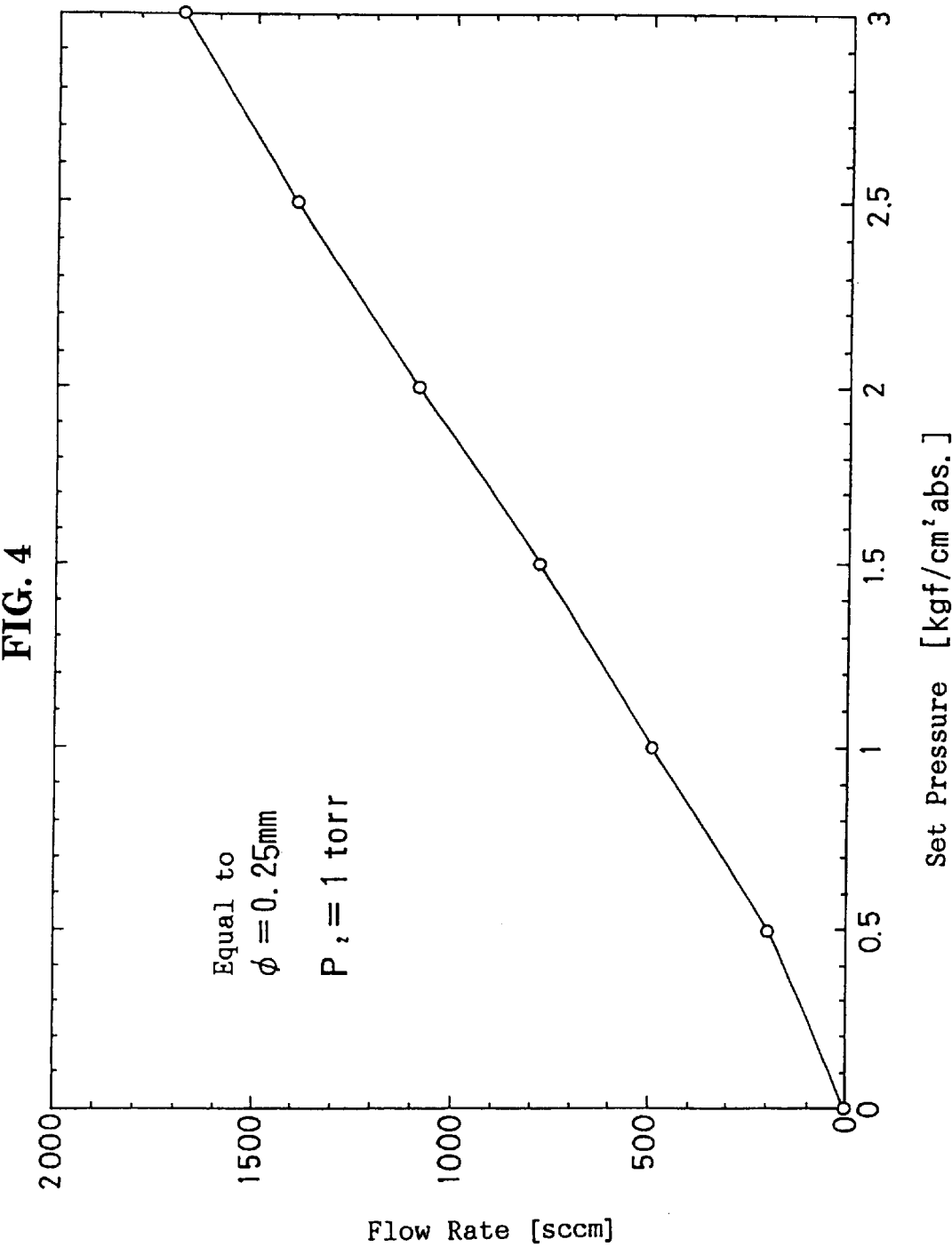
FIG. 4 illustrates another example of pressure-flow rate measurement results by the testing apparatus shown in FIG. 1.
Figure 5:
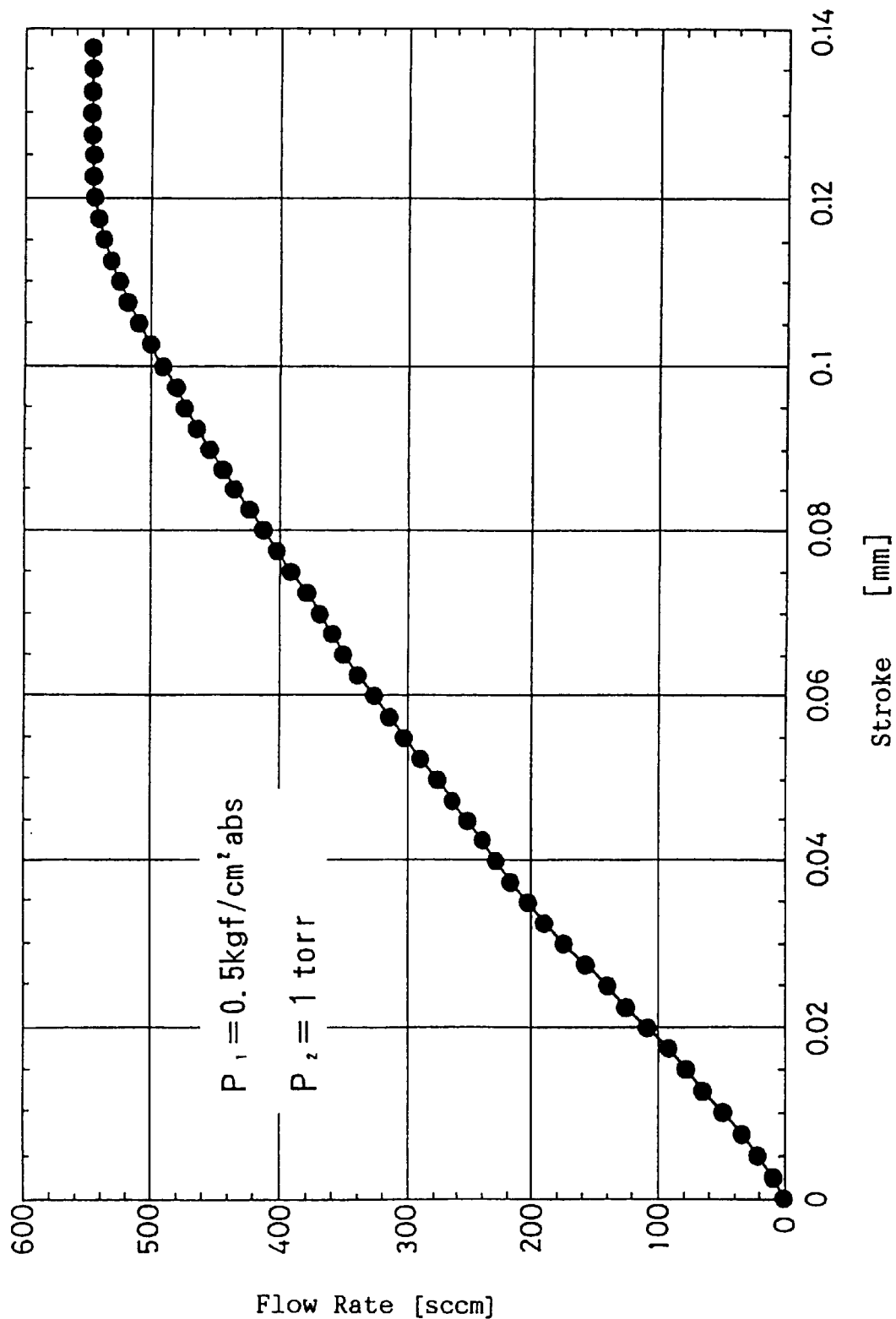
FIG. 5 shows the relationship between the stroke L (mm) of the diaphragm and the flow rate Q (sccm) in a case where the pressure P1 on the upstream side of the variable orifice and the pressure P2 on the downstream side of the variable orifice are fixed.
Figure 6:
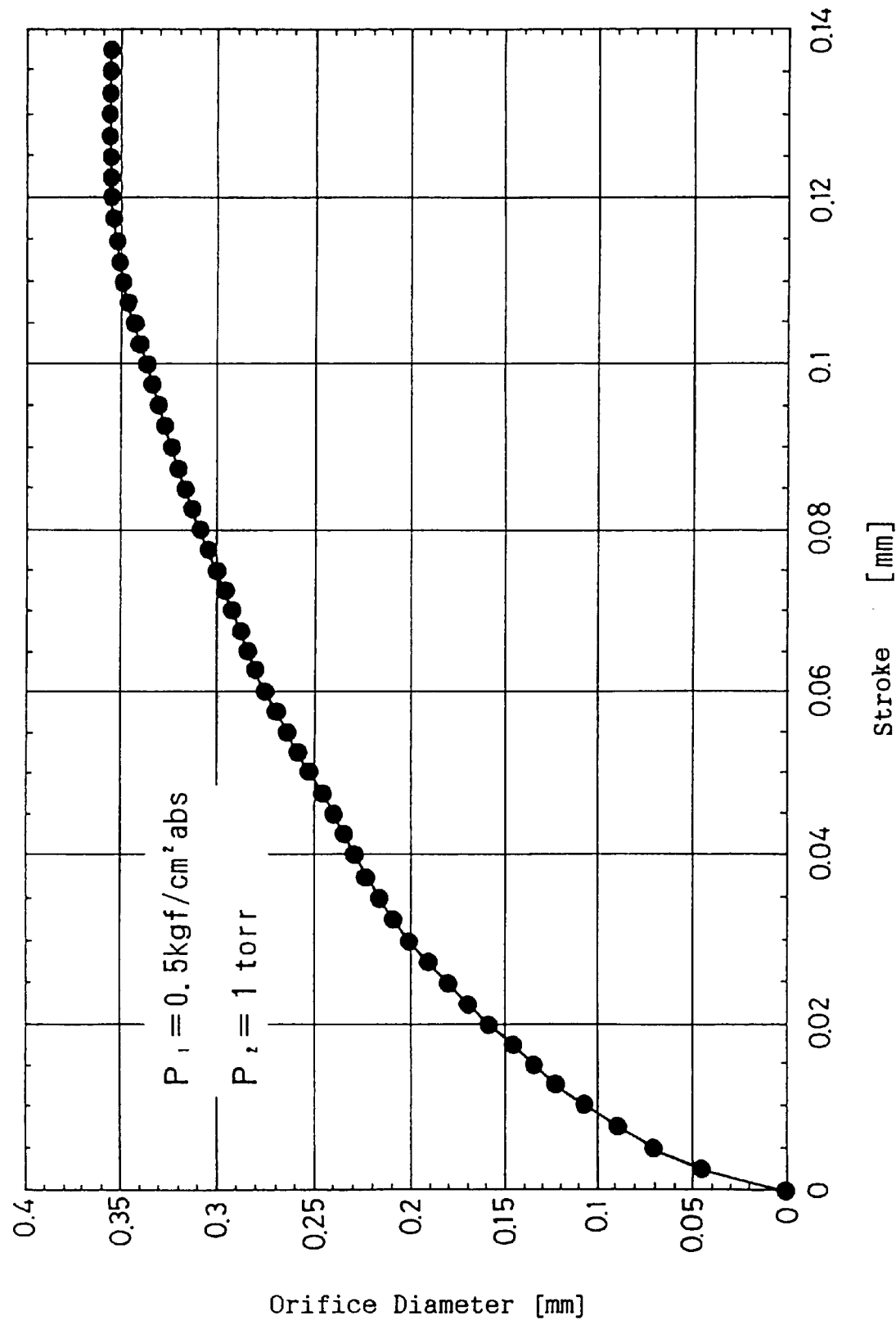
FIG. 6 shows the relationship between the stroke L (mm) of the diaphragm and the orifice bore Ø (mm), each bore calculated on the basis of each flow rate Q (sccm), in a case where the pressure P1 on the upstream side of the variable orifice and the pressure P2 on the downstream side of the variable orifice are fixed.

The control unit 7 shown in FIG. 7 is provided with a circuit which makes a correction so that the calculated value Q=KP1 of the flow rate Q may be equal to the pressure-flow rate curve as shown in FIG. 3 or FIG. 4 and with a storage unit to store data necessary to make such a correction.

EXAMPLE

Figure 9:
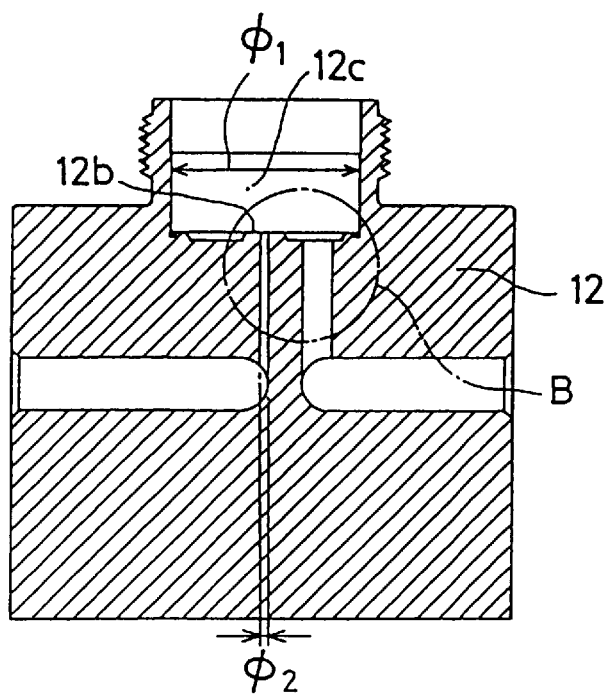
FIG. 9 is a vertical sectional view of a major part of a variable orifice in an example of the present invention.
Figure 10:
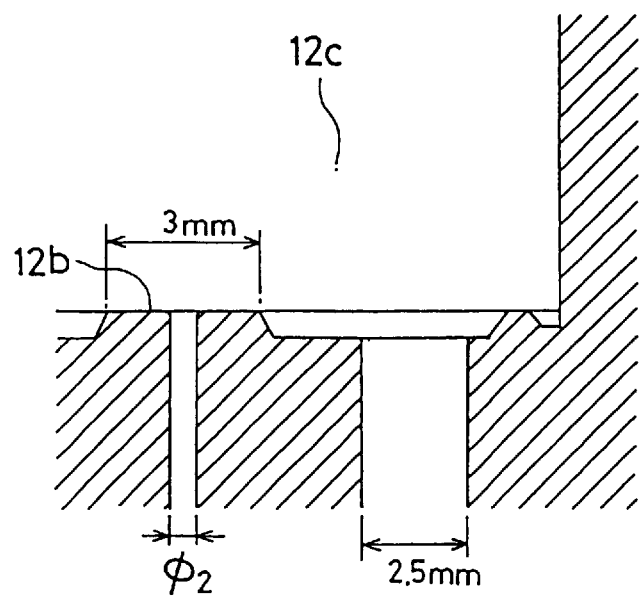
FIG. 10 is a partially enlarged view of FIG. 9.

FIG. 9 shows a main part of the valve main body 12 of the direct touch type metal diaphragm valve unit forming the variable orifice 5 used in the present invention. FIG. 10 is an enlarged view of the part indicated by the letter B in FIG. 9.

The inside diameter $\varnothing_1$ of the valve chamber 12c provided in the valve main body 12 is 15 mm. The inside diameter $\varnothing_2$ of the fluid inlet passage is 0.4 mm. The valve seat 12b is 3 mm $\varnothing$ in outside diameter and the fluid outlet passage is 2.5 mm $\varnothing$ in inside diameter.

Effects of the Invention

The present invention uses a direct touch type metal diaphragm valve unit as a variable orifice in a pressure type flow control, and switches the control flow rate range by changing the working stroke of the diaphragm.

This permits simplification of the construction of the orifice and eliminates all mechanically sliding parts in the fluid path, minimizing the generation of dust and particles to a nearly negligible level, unlike the prior art needle-type variable orifice.

Using the direct touch type metal diaphragm valve unit as a variable orifice substantially reduces so-called dead spaces within the fluid path, and eliminates spaces in the fluid path that trap gas. That substantially improves gas replaceability.

Furthermore, the orifice bore (that is, the flow rate range) can be accurately changed without difficulty through adjustment of the working stroke of the diaphragm. This significantly improves controlling efficiency as compared to the prior art, in which the orifice has to be replaced with another orifice having a different bore. As set forth above, the pressure type of flow rate control apparatus according to the present invention is useful especially in the gas supply system of semiconductor manufacturing facilities where super high-purity gases are handled.

What is claimed:

1. A pressure-type fluid flow rate control apparatus comprising an orifice, a control valve provided on an upstream side of the orifice, a pressure detector provided between the control valve and the orifice, and a control unit which calculates a fluid flow rate on the basis of pressure P1 detected by the pressure detector with the equation Qc=KP1 (K=constant) and outputs, in a drive for the control valve, the difference between a set flow rate signal Qs and the calculated flow rate signal Qc as a control signal Qy, wherein the pressure P1 on the upstream side of the orifice is regulated by actuating the control valve for controlling the flow rate Q of the fluid downstream of the orifice, so that the ratio P2/P1 between the pressure P1 on the upstream side of the orifice and the downstream pressure P2 is maintained at not higher than the critical pressure ratio of the controlled fluid, characterized in that a direct touch type metal diaphragm valve unit functions as the orifice and that a ring-shaped gap between a valve seat and a diaphragm serves as a variable orifice, and a pulse motor type drive for regulating said ring-shaped gap.

2. A pressure-type fluid flow rate control apparatus as claimed in claim 1 wherein the working stroke L of the diaphragm ranges from 0 to 0.12 mm.

3. A pressure-type fluid flow rate control apparatus as claimed in claim 1 wherein the ring-shaped gap between the valve seat and the diaphragm has an area equal to a sectional area of a circular bore of 0.14 to 0.25 mm in diameter.

4. A pressure-type flow rate control apparatus as claimed in claim 1 wherein the pulse motor drive comprises a stepping motor and a ball screw mechanism.

5. A pressure-type fluid flow rate control apparatus comprising an orifice, a control valve provided on the upstream side of the orifice, a pressure detector provided between the control valve and the orifice, and a control unit which calculates a fluid flow rate on the basis of pressure P1 detected by the pressure detector with the equation Qc=KP1 (K=constant) and outputs, in a drive for the control valve, the difference between a set flow rate signal Qs and the calculated flow rate signal Qc as a control signal Qy, wherein the pressure P1 on the upstream side of the orifice is regulated by actuating the control valve for controlling the flow rate Q of the fluid downstream of the orifice, so that the ratio P2/P1 between the pressure P1 on the upstream side of the orifice and the downstream pressure P2 is maintained at not higher than the critical pressure ratio of the controlled fluid, characterized in that a direct touch type metal diaphragm valve unit functions as the orifice and that a ring-shaped gap between a valve seat and a diaphragm serves as a variable orifice and a piezoelectric element type drive for regulating said ring-shaped gap.

6. A pressure-type fluid flow rate control apparatus as claimed in claim 5 wherein the working stroke L of the diaphragm ranges from 0 to 0.12 mm.

7. A pressure-type flow rate control apparatus as claimed in claim 5 wherein the ring-shaped gap between the valve seat and the diaphragm has an area equal to a sectional area of a circular bore of 0.14 to 0.25 mm in diameter.

8. A pressure-type flow rate control apparatus for controlling a fluid, said apparatus comprising:

a variable orifice comprising a ring-shaped gap between a valve seat and a diaphragm of a direct touch type metal diaphragm valve unit, said valve unit being responsive to an electrical orifice degree of opening setting signal for setting the degree of opening of said variable orifice;

a control valve disposed on an upstream side of said variable orifice;

a pressure detector disposed between said control valve and said variable orifice for measuring an upstream pressure P1 at an upstream side of said orifice;

a control unit for calculating a fluid flow rate signal Qc according to the equation Qc=KP1, where K is a constant, said control unit producing an output signal Qy representing the difference between a set flow rate signal Qs and said calculated flow rate signal Qc, said signal Qy being applied to said control valve to control a flow rate Q of fluid on a downstream side of said variable orifice such that the ratio of P2/P1 between the pressure P1 on the upstream side of said variable orifice and a pressure P2 on a downstream side of said variable orifice is maintained at not higher than the critical pressure ratio of the controlled fluid.

9. A pressure-type flow rate control apparatus as claimed in claim 8 wherein said valve unit includes a pulse motor type drive for setting the degree of opening of said variable orifice.

10. A pressure-type flow rate control apparatus as claimed in claim 9, wherein the pulse motor drive comprises a stepping motor and a ball screw mechanism.

11. A pressure-type flow rate control apparatus as claimed in claim 8, wherein said valve unit includes a piezoelectric element type drive for setting the degree of opening of said variable orifice.

12. A pressure-type flow rate control apparatus as claimed in claim 11, wherein the working stroke L of said diaphragm ranges from 0 to 0.12 mm.

13. A pressure-type flow rate control apparatus as claimed in claim 12, wherein the ring-shaped gap between the valve seat and the diaphragm has an area equal to a sectional area of a circular bore of 0.14 to 0.25 mm in diameter.

14. A pressure-type flow rate control apparatus as claimed in claim 8, wherein the working stroke L of said diaphragm ranges from 0 to 0.12 mm.

15. A pressure-type flow rate control apparatus as claimed in claim 14, wherein the ring-shaped gap between the valve seat and the diaphragm has an area equal to a sectional area of a circular bore of 0.14 to 0.25 mm in diameter.

* * * * *